April 25, 1961 J. GILLOIS ET AL 2,981,221
SELF PROPELLED AMPHIBIOUS VEHICLES
Filed June 3, 1957 9 Sheets-Sheet 1

Inventors
Jean GILLOIS
Hermann Walter GEHLEN

BY Robert H. Jacob

AGENT

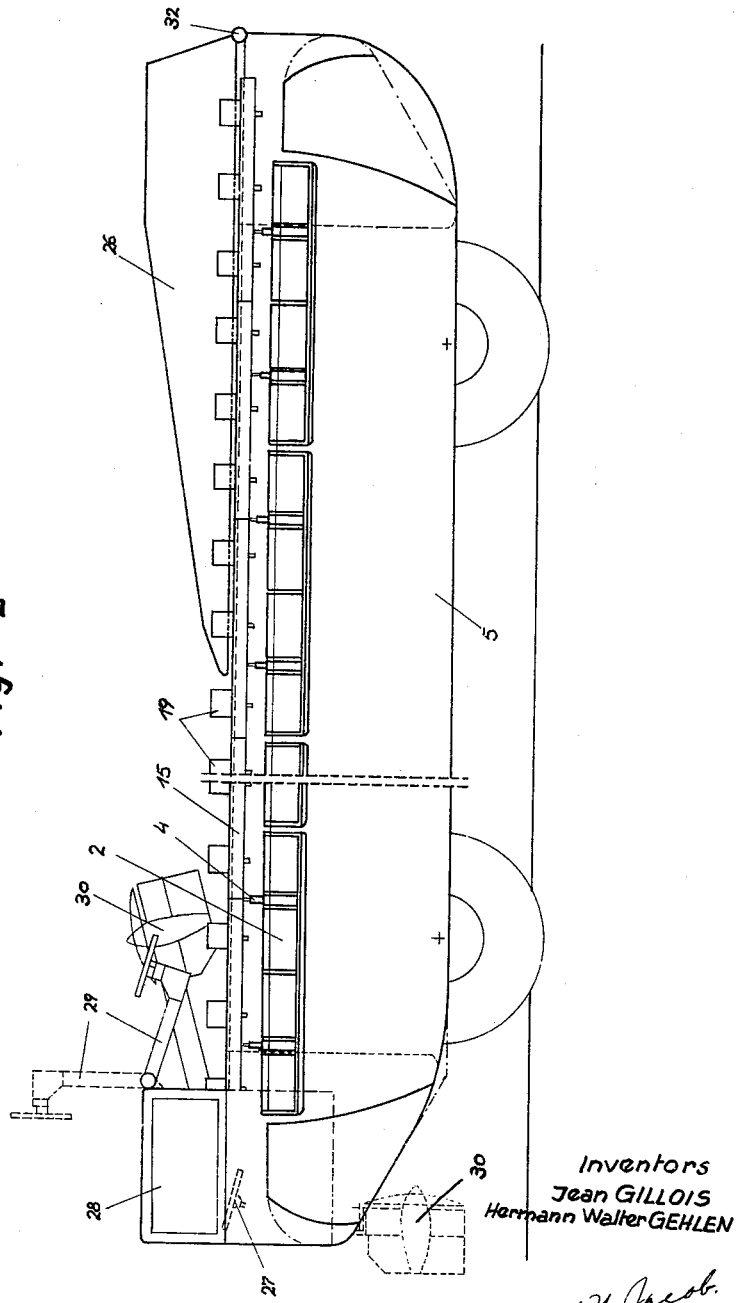

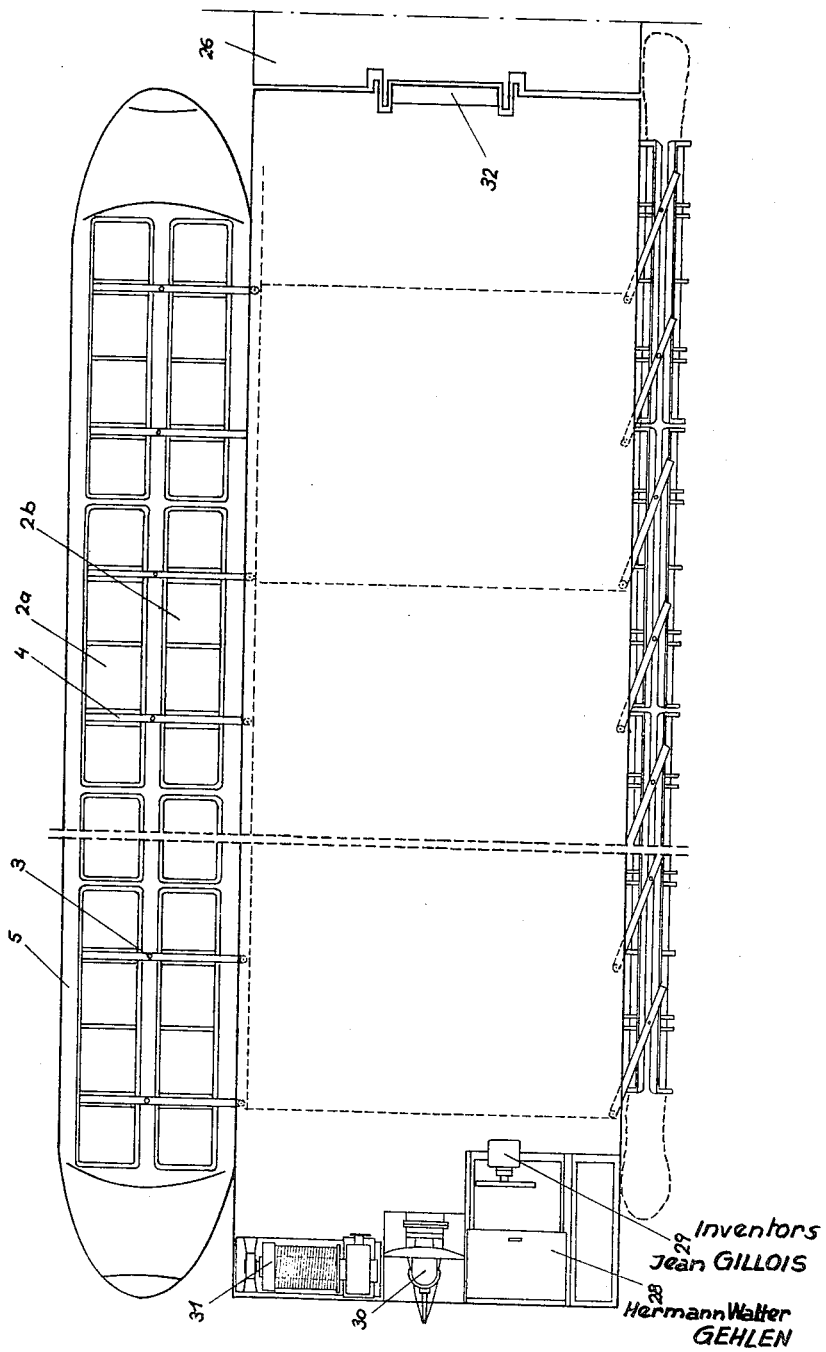

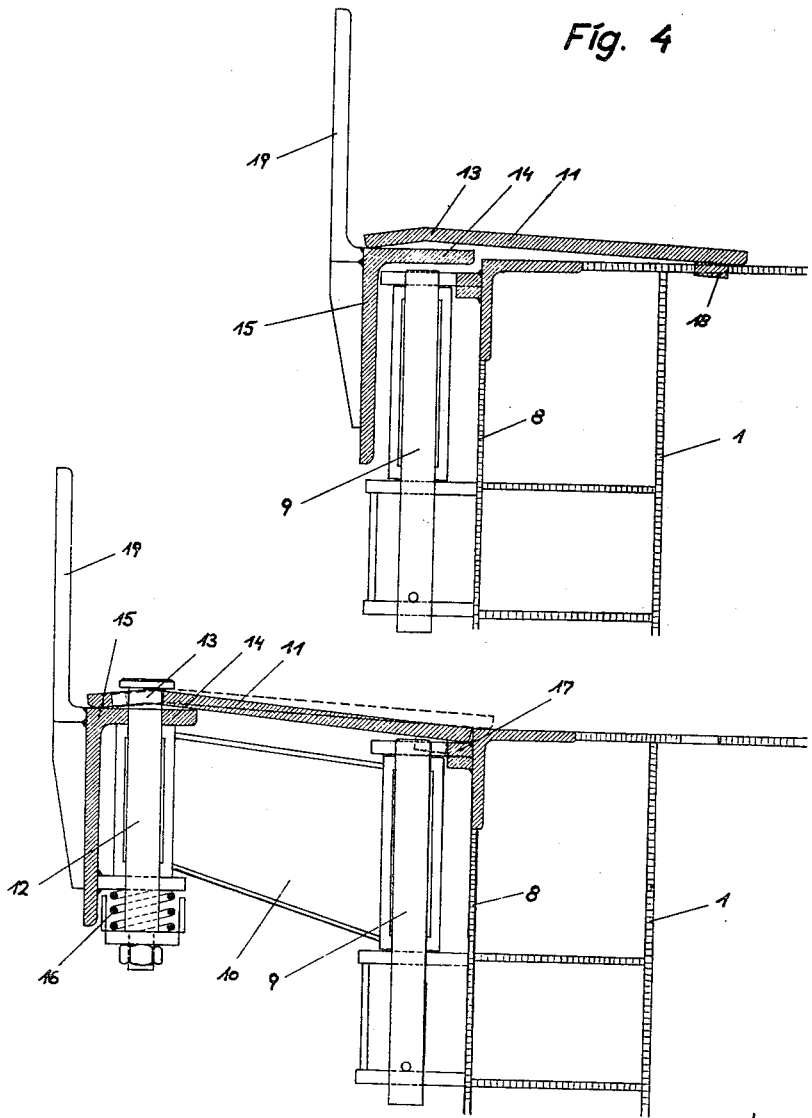

April 25, 1961  J. GILLOIS ET AL  2,981,221
SELF PROPELLED AMPHIBIOUS VEHICLES
Filed June 3, 1957  9 Sheets-Sheet 6

INVENTORS
JEAN GILLOIS AND
HERMANN WALTER GEHLEN
BY Robert H. Jacob
AGT.

April 25, 1961

J. GILLOIS ET AL 2,981,221

SELF PROPELLED AMPHIBIOUS VEHICLES

Filed June 3, 1957

INVENTORS
JEAN GILLOIS AND
HERMANN WALTER GEHLEN
BY Robert K. Jacob
AGT.

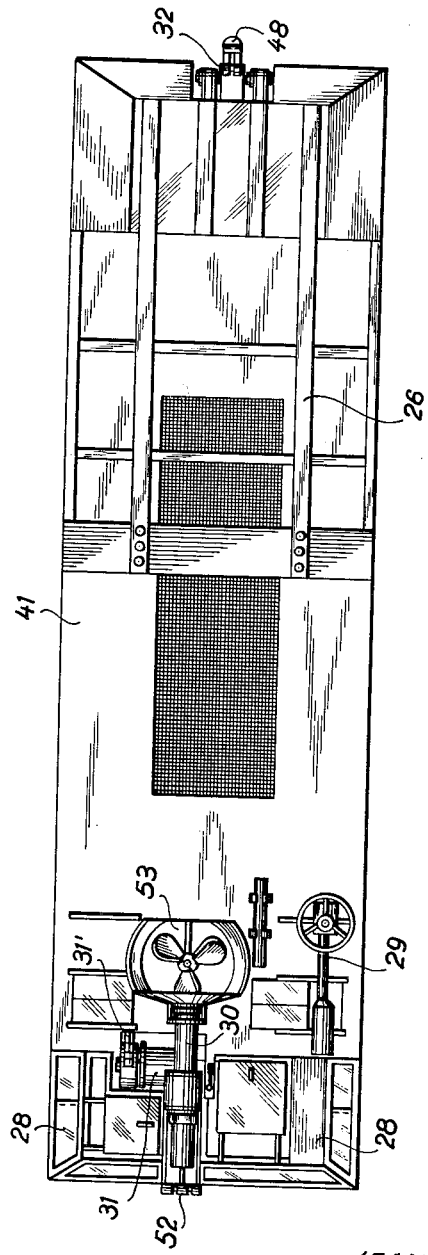

INVENTORS
JEAN GILLOIS AND
HERMANN WALTER GEHLEN

BY Robert H. Jacob.

AGT.

United States Patent Office 2,981,221
Patented Apr. 25, 1961

2,981,221

SELF PROPELLED AMPHIBIOUS VEHICLES

Jean Gillois, Rastatt, and Hermann Walter Gehlen, Kaiserslautern, Pfalz, Germany, assignors, by mesne assignments, to Dipl. Ing. Hermann Walter Gehlen, Kaiserslautern, Pfalz, Germany Filed June 3, 1957, Ser. No. 666,261

Claims priority, application Germany June 4, 1956

12 Claims. (Cl. 115—1)

The present invention relates to self-propelled amphibious vehicles.

Known forms of amphibious vehicles which are self propelled are not suitable for receiving comparatively heavy loads and have no means which would permit heavy land vehicles to be driven directly on to them.

It is the primary object of the invention to improve vehicles of the type known heretofore and it is a further object of the invention to construct them in such manner that they are suitable for use in shallow water and in the region of the shore, that is to say, with a particularly shallow draught.

These problems are solved in accordance with the present invention by a self-propelled amphibious vehicle which is constructed as a ferry with a wide platform and has disposed at one end a ramp which is foldable onto the platform, the chassis or wheels of the vehicle being retractable into inverted air-tight chambers of the ferry which are open only at the base where they are closed by the water when the ferry is in floating condition.

It is a particular advantage to arrange between the ferry and the ramp a system of rods which is actuated hydraulically, mechanically or otherwise, whereby the ramp may be swung out into the operative position and swung in into a position of rest on the platform and is also adapted to be retained at predetermined angles of inclination relatively to the platform of the ferry. The ramp may be constructed as a hollow body to increase buoyancy.

It is preferred to arrange the operating mechanisms for the control, steering and the drive at that end of the ferry remote from the ramp.

With this arrangement of the operating mechanism it is also preferred to accommodate the operating mechanism for the steering and the drive of the vehicle during land travel, within a housing located on one side of the vehicle, and to arrange the operating mechanism for control and the drive, when travelling on water, on the roof of said housing so as to ensure easier supervision and to enable the mechanism to be flapped over onto the deck of the vehicle.

The drive of the propeller, for travel on water, is preferably arranged at the forward end of the vehicle and is so constructed that it may be adjusted in height and can be folded over on to the deck of the vehicle during land travel.

The possibility of adjusting the height of the propeller is very important for voyages in deep and shallow water. In order to render travel possible at all or to facilitate it, in shallow water, buoyance may be increased by arranging along the side walls of the ferry additional floating bodies which consist of resilient material which can be filled with air or deflated by conventional devices.

For filling and evacuating the wheel chambers and additional floating bodies, a compressed air installation coupled to the driving unit and associated with compressed air cylinders may be provided within the body of the ferry.

A further object of the invention is to provide means whereby, for tactical reasons, the vehicle when remote from the shore may be prepared so that it is immediately ready for action, yet the vehicle should have the smallest possible width when travelling through streets. This object is achieved in the present invention by the provision of carrier plates which are arranged between the brackets and the floating bodies of resilient material and are divided in the axial and transverse direction of the vehicle to enable individual parts thereof to be flapped over. The individual parts of the carrier plates are preferably constructed identical with one another so as to be interchangeable.

In a convenient form of the invention attachments are provided on the sides of the vehicle for widening the road surface when used as a ferry. Each of these attachments may also be displaced into its operative position during the sea journey of the vehicle so that the vehicle is ready for use immediately it reaches the site of its operations.

Vehicles constructed in accordance with the present invention have the advantage that they may operate not only with their own drive on water and on land, but by means of the folding ramps, they can be utilised immediately to ferry heavy vehicles across water without the use of additional or auxiliary means. Owing to their retractable chassis and their additional inflatable floating body, they may be used also in shallow waters and in the region of the shore. They may therefore also be used for receiving loads and vehicles from ships which cannot closely approach the shore.

Due to the division of the carrier plates into individual parts of the same size, it is made possible for vehicles having carrier plates and floating bodies in the already mounted condition to travel to the place of use. Before travelling into the water it is only necessary to inflate the lateral floating bodies. By inflating the floating bodies, the carrier plates are arranged and automatically locked in their end positions. The advantage of the possibility of folding up the carrier plates is that the width of the vehicle is much less for travel to the shore than during the travel of the vehicle with the floating bodies inflated. By this means it is possible to use narrow roads and streets and the final preparations on the bank before use in the water are reduced to a minimum.

Further features of the invention and details of the advantages achieved thereby will be apparent from the following description of embodiments of the invention shown in the accompanying drawings in which:

Figure 2 is a corresponding side elevation

Figure 3 a corresponding plan view

Figures 4 and 5 are details showing in cross section an attachment consisting of pivotable brackets and an extension plate disposed in the swung-in and swung-out positions respectively.

Figure 6:
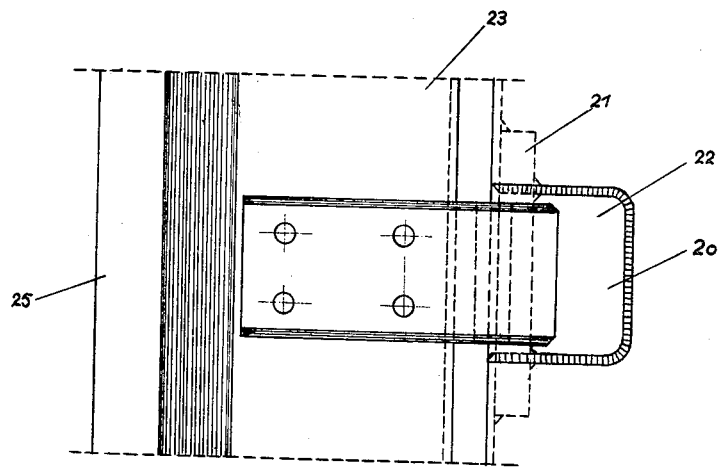
Figure 7:
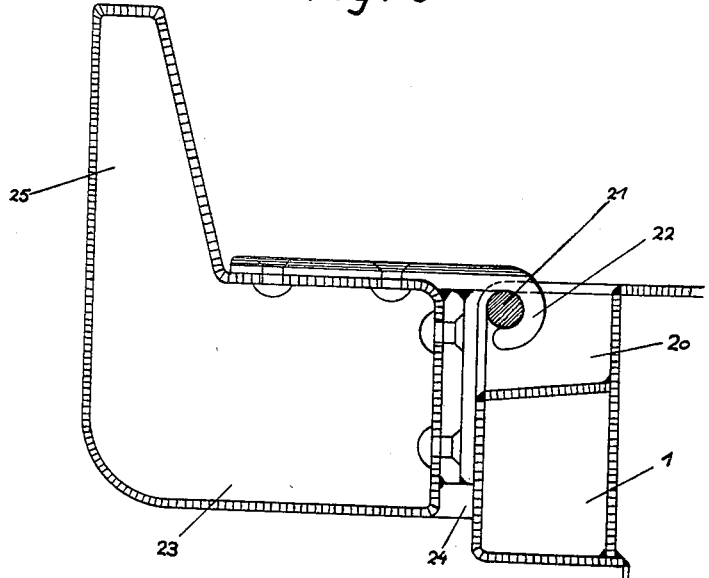

Figures 6 and 7 show in plan and in cross section a side attachment which is hooked to the vehicle.

Figure 8:
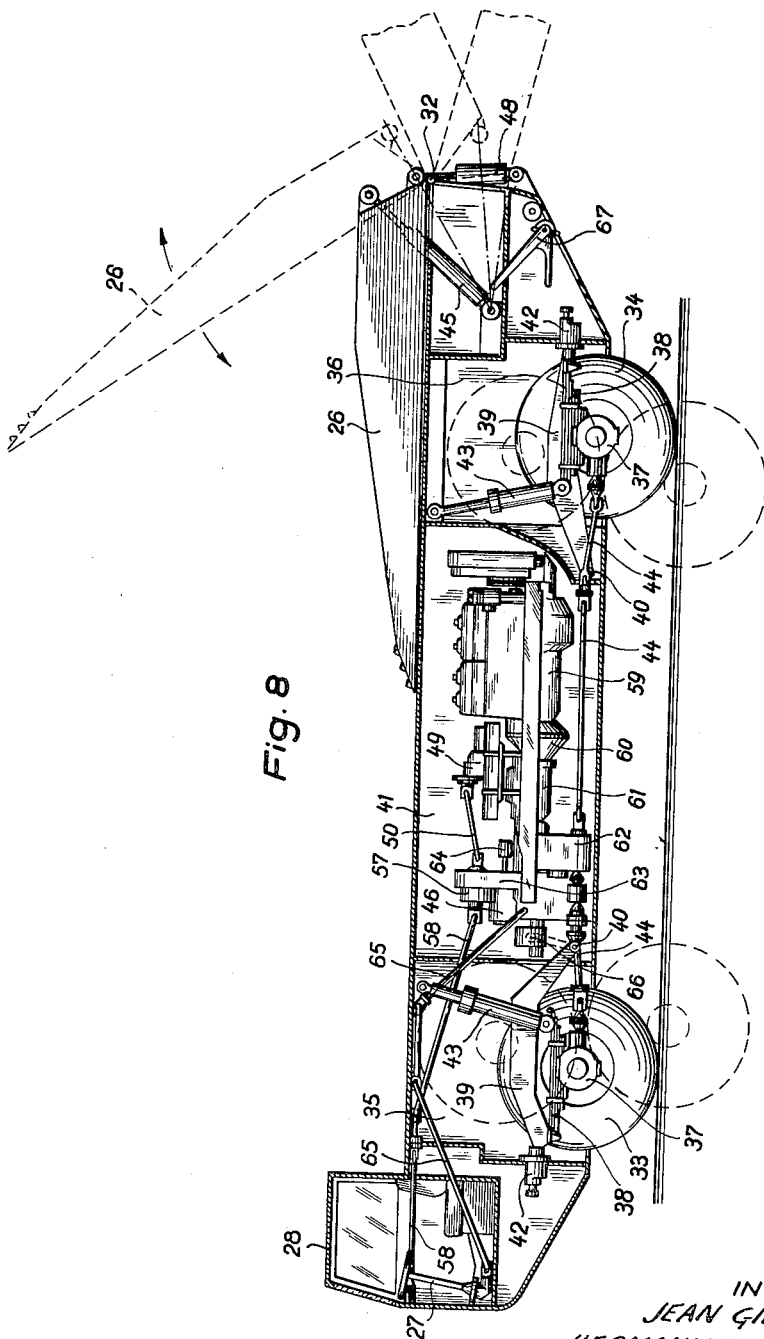
Figure 9:
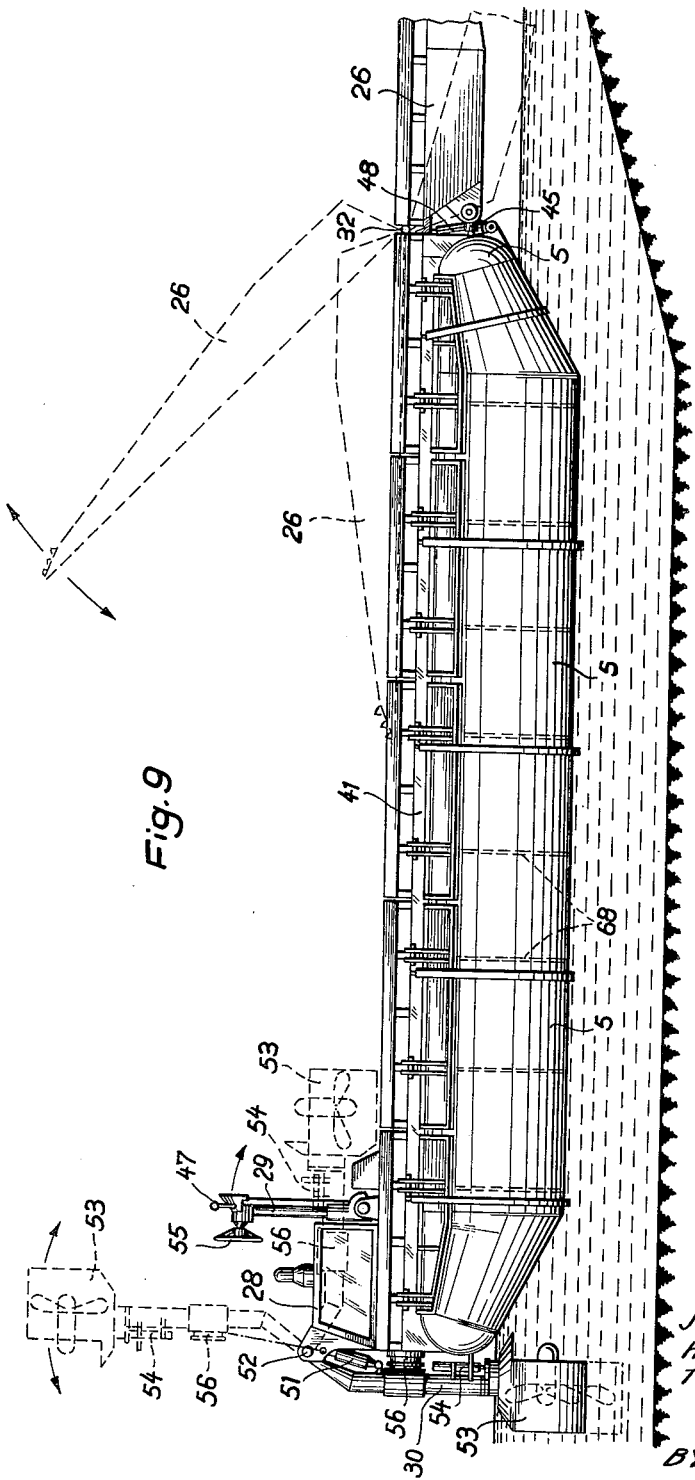

Fig. 8 is a longitudinal section through the vehicle which is shown in the running condition for street and terrain travel, Fig. 9 is a side view of the vehicle arranged as a floating ferry in non-loaded condition with the ramp, the power dragging unit and the steering means in operative condition and with the floating bodies inflated.

Figure 10A:
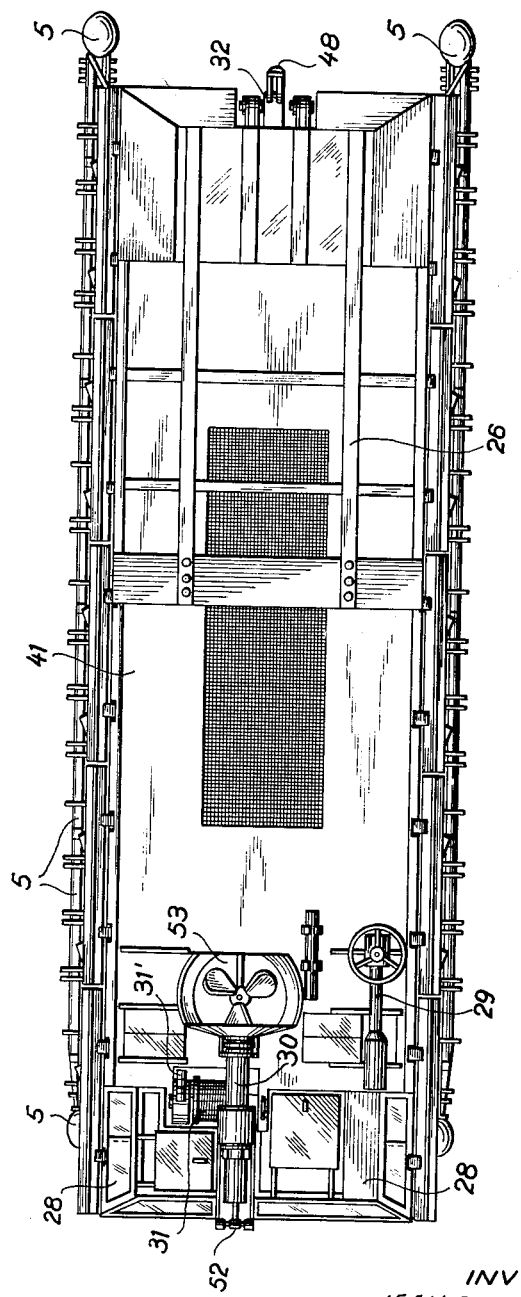

Fig. 10 is a top view of the vehicle with the floating bodies removed arranged for street travel, and Fig. 10a is a view similar to Fig. 10 with the floating bodies in position ready to be inflated for using the vehicle as a ferry.

Figure 1:
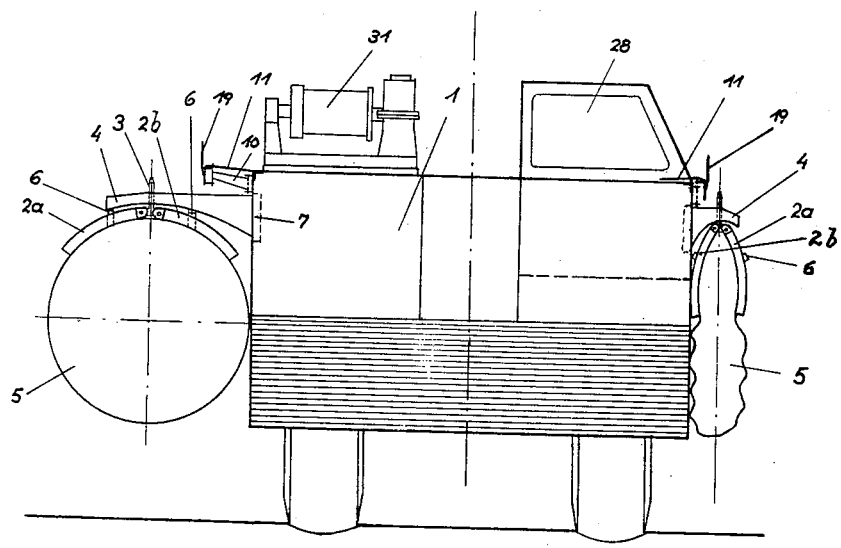
Figure 1 is an end elevation of a vehicle constructed as a ferry.

In the view of a vehicle 1 which is constructed as a ferry and is shown in Figure 1, a floating body 5 of resilient material, with the carrier plates 2, is shown in the inflated condition on the left, and in the deflated condition on the right. The carrier plates 2 are divided in the axial and transverse direction of the vehicle into parts 2a, 2b which are hinged to and suspend from a vertical bolt 3 which is rotatably mounted on a bracket 4 at the side of the vehicle. In the inflated condition, the floating bodies 5 force the carrier plates 2a, 2b apart until they are abut against the brackets 4 by means of projections 6 and are locked in such end position of displacement. Figure 3 shows the vehicle in plan view, with the floating bodies 5 at the upper part of the drawing inflated and in the lower part deflated respectively. When the body 5 is deflated it will be appreciated that the brackets 4 are in their swung-in position.

For comparatively long journeys over land the floating bodies 5 and the carrier plates 2 are removed from the brackets 4 and the brackets 4 folded into recesses 7 of the vehicle in order to reduce the width of said vehicle.

A further possibility of keeping the width of the vehicle as small as possible during the travel and enlarging said width for use, consists in the arrangement of lateral attachments. In Figures 4–7, two different forms of construction and arrangement of attachments for widening the deck of the vehicle are shown on a larger scale. In Figure 3 the attachments are not shown for the sake of clearly illustrating the divided carrier plates for the floating bodies 5 of elastic material, while an end ramp 26 is shown in its swung-out or operative position. In the embodiment shown in Figures 4 and 5, the vehicle has brackets 10 at its sides, said brackets being pivotable about vertically disposed bolts 9 secured to the longitudinal sides of the vehicle and extension plates 11 are secured at the ends thereof by means of bolts 16. The plates 11 are kinked in cross section on the free end of the brackets 10 above the place of attachment. By this kink 13 each plate 11 is disposed on the horizontal flange 14 of an angle iron member 15 extending in the axial direction of the vehicle and connecting the free ends of the brackets 10 and is thereby mounted slightly resiliently. Similarly a bolt 12 holding a plate 11 is resiliently loaded on its longitudinal axis by a helically wound spring 16. In the swung-out position the inner longitudinal edge of the plate 11 is located on a butt strap 17 mounted on the vehicle so that the upper edge of the plate lies substantially in the plane of the deck of the vehicle.

In order to swing-in the open brackets 10 and the plates 11, these are raised on to the deck of the vehicle at their free end by means of a hook. Then the brackets 10 can be swung into the recesses at the sides of the vehicle about the bolts 9. The free end of each plate 11 is provided with a projection 18 which engages in an opening in the deck of the vehicle when the brackets 10 are in the swung-in position and retains the brackets and the plate in their swung-in positions.

A curb or scraping board 19 is mounted on the outside of the angle iron member 15.

A modified form of attachment is shown in Figures 6 and 7. In this case the vehicle has recesses 20 on the sides of its deck, which recesses are bridged longitudinally of the vehicle by a short round iron bar 21 welded or otherwise rigidly secured to the wall of the vehicle. The extension attachments 23 are suspended from the round iron bar member 21 by means of hooks 22. They are supported by their lower portion directly against the wall of the vehicle with the insertion of a plate or butt strap 24. Each attachment is constructed as a hollow girder and the outer or free end 25 thereof is raised to function as a curb.

The operating mechanism for the control, steering and drive of the vehicle are disposed at the end of the vehicle remote from the ramp 26. The operating mechanism 27 for steering and the drive during land travel, is accommodated in the housing 28 arranged on one side of the vehicle (Figures 2 and 3) whilst the operating mechanism 29 for the required control and the drive during travel on water is arranged on the roof of the housing 28 and can be turned over onto the deck of the vehicle when not in use. The drive 30 of the propeller is adjustable in height and is also turned over onto the deck of the vehicle when the ferry is used as a land vehicle. The arrangement is such that the propeller can be swung between the control housing 28 on one side and a winch arrangement 31 on the other side of the vehicle. The ramp 26 attached to the joint 32 is shown in Figure 2 reversed on to the deck of the vehicle.

Fig. 8 illustrates the manner in which the road driving means or street driving carriages 33 and 34 can be completely retracted in hermetically closed wheel chambers 35 and 36. For this purpose the axles 37 are connected with the pivot frame 39 by means of springs 38. The pivot frames 39 in turn are journalled at 40 on the vehicle body 41. The free ends of the pivot frames 39 are securely latched by means of the hydraulic or mechanical latching members 42 for street driving operation. The entire driving mechanism can be withdrawn and extended after hydraulically or mechanically releasing the latching members 42 with the aid of the two way hydraulic operating cylinder 43. As shown in Fig. 8, the hydraulic cylinder 43 also makes it possible to extend the street driving carriages 33 and 34 sufficiently to permit change of tires without having any special recesses in the wheel chambers 35 and 36. The universal joint or cardan shaft 44 is arranged to drive both axles.

The arrangement of the retractible axles provides considerable advantages for using the vehicle as a ferry because the draft and the water flow resistance of the vehicle are considerably reduced. Besides the driving of the vehicle out of the water under its own force is considerably improved because the extending of the driving carriages at the banks permits considerable wheel pressure and therefore the transmission of considerable driving force. Furthermore the retracting of the driving carriages insures that the axles during the loading of the ferry even along a flat shore are not subjected to additional loading and are moreover well protected against agressive water and mechanical damage. Since the driving carriages can be extended by means of the hydraulic cylinder 43 to any desired extent out of the vehicle body 41, the vehicle is adapted for traveling over land even under the severest conditions.

Fig. 8 furthermore illustrates the manner in which the ramp 26 can be shifted around the pivot joint 32 by means of the hydraulic cylinders 45 from the position of transportation on the deck of the vehicle to the different operating positions in a continuous manner. For this purpose the hydraulic pump 46 is connected to the vehicle transmission the fluid flow of which can be controlled by means of the hydraulic control 47 (Fig. 9) which is provided on the steering standard 29.

The suitable arrangement of the hydraulic cylinder 45 also insures that in the different operating positions of the extended ramp a considerable distance is provided between the axis of the hydraulic cylinder and the pivot joint 32 of the ramp. Closing the hydraulic control 47 shuts off the oil in the hydraulic cylinder 45 and establishes a rigid connection between the ramp 26 and the vehicle body 41 which is capable of supporting great stresses. Inasmuch as for the pivotal movement of the ramp 26 the axis of the hydraulic cylinder 45 coincides with the center of the pivot joint 32 of the ramp after the ramp passes through an angle of approximately 90° and therefore the cylinder becomes ineffective at this point, an additional hydraulic operating cylinder 48 is provided which in that position takes over the swinging of the ramp. The connecting of this cylinder 48 can be effected by a special control, or automatically. The ramp 26 may be provided with an additional cowling to improve the driving of the ferry.

The arrangement of the ramp which is adapted to be shifted to different operating positions for loading and unloading of the ferry insures the adaptation of the vehicle for different shore or bank conditions. The establishment of a rigid connection between the ramp and the vehicle or pontoon with the directly accessible upper vehicle deck permits the loading and the unloading of the ferry without placing the body of the vehicle on the shore. Furthermore locating the ferry along the shore or bank permits pressing the point of the ferry by means of hydraulic cylinder 45 firmly against the shore or bank which makes unnecessary any particular anchoring of the ferry upon said shore or bank.

The wheel chambers 35 and 36 illustrated in Fig. 8 which are open at the bottom are filled by means of the air compressor 49 which is connected to the transmission of the vehicle. This compression device serves at the same time for filling and emptying the lateral auxiliary floating bodies 5 (Fig. 1). The compressor is driven by means of the cardan shaft 50. The compressed air is conducted by means of conduits which are not shown to the wheel chambers or to the filling connections for the lateral floating bodies.

The wheel chambers shown act in the manner of a diving bell and prevent to a considerable extent the entrance of the water into the chambers when the ferry is in high horizontal floating position. The additional introduction of air into the chambers is merely intended to completely displace the water which has entered during the activating of the ferry or as a result of the driving velocity and the difference in pressure.

The propeller assembly 30 shown in Fig. 9 for driving in the water when the vehicle is activated as a ferry is swung over onto the deck about pivot 52 by means of the hydraulic operating cylinder 51 to provide for street traffic in order to obtain a sufficient clearance while traveling on land. The under water portion 53 of the propeller assembly 30 can be adjusted by means of the hydraulic operating cylinder 54. This provides for adaptation to the different drafts of the ferry in loading and unloading condition. The under water portion 53 is also constructed around the vertical axis of the propeller assembly. The rotation of the under water portion 53 is likewise controlled from the swingable steering standard 29 by means of the hand wheel 55 by way of linked shafts (not shown) and the toothed coupling 56. The pivotable arrangement of the under water portion 53 provides for excellent maneuverability of the ferry. The driving of the propeller assembly is effected in accordance with Fig. 8 from the transmission for the street operation by way of a coupling 57 which can be shifted under full load, cardan shafts 58, toothed coupling 56 through two cone gear transmissions in the propeller assembly and to the propeller.

Also the street driving arrangement is illustrated in Fig. 8. The driving takes place by means of motor 59 by way of coupling 60, the automatic shifting transmission 61, the intermediate transmission 62, the cardan shafts 44 to the front and rear axles 37. In the intermediate transmission 62 the front and rear axles may be optionally connected and disconnected. The hydraulic pump 46 is driven by way of the distributing transmission 63, the coupling for the ferry drive 57, the air compressor 49 and pump 64. The steering of the vehicle for street travel is effected in accordance with Fig. 8 from the driver cabin 28 by way of steering standard 27 and through the cardan shafts 65 which are brought over the forward wheel chamber 35 and the steering gear of the axle 37. To support the steering power a hydraulic auxiliary means 66 is provided.

Anchor 67 is also shown in Fig. 8 which is connected by means of a chain or tow to the winch 31 shown in Fig. 10. The winch is hydraulically driven by way of the oil motor 46 (Fig. 8).

As illustrated in Fig. 8 the pontoon body 41 is subdivided by the walls of the wheel chambers 35 and 36 into five individual water chambers. In Fig. 9 it can be seen that the lateral floating bodies 5 are also subdivided by bulkheads 68, each into nine individual chambers.

It is evident from the description of the attached drawings that all parts for the operation, for the transportation in the street as well as by railway which insure the activation and the withdrawing of the ferry vehicle, are constantly with the vehicle and thus provide for the very rapid operability of the vehicle.

We claim:

1. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said retractable land propulsion means, and power actuated rods extending between said body and said ramp adapted to swing said ramp about said hinge means into operative position at predetermined angles of inclination and back to inoperative position.

2. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said tractable land propulsion means, and power actuated rods connected to said source of power and extending between said body and said ramp adapted to swing said ramp about said hinge means into operative position at predetermined angles of inclination and back to inoperative position and operating mechanisms including control means and vehicle steering and driving means disposed at the end of said vehicle remote from said ramp.

3. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said retractable land propulsion means, and power actuated rods connected to said source of power and extending between said body and said ramp adapted to swing said ramp about said hinge means into operative position at predetermined angles of inclination and back to inoperative position and operating mechanisms including control means and vehicle steering and driving means disposed at the end of said vehicle remote from said ramp, the said steering and driving means being arranged during land travel in a housing disposed on one side of said vehicle.

4. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said retractable land propulsion means, and power actuated rods connected to said source of power and extending between said body and said ramp adapted to swing said ramp about said hinge means into operative position at predetermined angles of inclination and back to inoperative position and operating mechanisms including control means and vehicle steering and driving means disposed at the end of said vehicle remote from said ramp, the said steering and driving means being arranged during land travel in a housing disposed on one side of said vehicle and said control means and driving means being disposed on the roof of said housing during travel on water and being pivotally movable onto the deck of said vehicle.

5. A self propelled amphibious vehicle comprising, in combination, a buoyant body constituting a ferry, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive retractable wheels or the like, and power actuated rods extending between said body and said ramp adapted to swing said ramp about said hinge means into operative position at predetermined angles of inclination and back to inoperative position and operating mechanisms including control means and vehicle steering and driving means disposed at the end of said vehicle remote from said ramp, the said steering and driving means being arranged during land travel in a housing disposed on one side of said vehicle and, said control means and driving means being disposed on the roof of said housing during travel on water and being pivotally movable onto the deck of said vehicle, and a propeller drive for water travel mounted laterally of said housing and pivotally movable onto said platform during land travel.

6. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said retractable land propulsion means, floating bodies of resilient material being mounted along the side walls of said body, said bodies being inflatable by conventional means, and a compressor plant including compressed air containers disposed inside said body for filling and evacuating said wheel chambers and said floating bodies.

7. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said retractable land propulsion means, and a plurality of brackets mounted laterally of said ferry body adapted to support said floating bodies, of resilient material capable of being inflated by conventional means, brackets being pivotally movable into recesses in the sides of said ferry body.

8. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive said retractable land propulsion means, and a plurality of brackets mounted laterally of said ferry body adapted to support said floating bodies of resilient material capable of being inflated by conventional means, brackets being pivotally movable into recesses in the sides of said ferry body, and supporting a plurality of divided carrier plates hingedly connected in pairs longitudinally of said vehicle and supporting said floating bodies.

9. A self propelled amphibious vehicle comprising, in combination, a buoyant body constituting a ferry, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive retractable wheels or the like, and a plurality of adjustable attachments for widening said platform comprising brackets mounted on vertical pivot bolts secured to the longitudinal sides of said vehicle, vertical supporting bolts extending endwise of said brackets, one on each side of said vehicle to provide a longitudinal support, and lateral extension plates supported along their outer edges on said brackets by means of said supporting bolts.

10. A self propelled amphibious vehicle comprising, in combination, a buoyant body constituting a ferry, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive retractable wheels or the like, and a plurality of adjustable attachments for widening said platform comprising brackets mounted on vertical pivot bolts secured to the longitudinal sides of said vehicle, vertical supporting bolts extending endwise of said brackets, one on each side of said vehicle to provide a longitudinal support, and lateral extension plates supported along their outer edges on said brackets by means of said supporting bolts, each said extension plate having an outer side defining a kinked portion constituting a longitudinal flange resting on said angle iron, and the side walls of said platform presenting butt straps extending longitudinally of said vehicle and supporting the inner sides of said plates substantially in alignment with said platform, and said supporting bolts being resiliently mounted.

11. A self propelled amphibious vehicle comprising, in combination, a buoyant body constituting a ferry, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted air-tight chambers, adapted to be closed at the bottom by water, for the floating condition of said vehicle, and adapted to receive retractable wheels or the like, and a plurality of adjustable attachments for widening said platform comprising brackets mounted on vertical pivot bolts secured to the longitudinal sides of said vehicle, vertical supporting bolts extending endwise of said brackets, one on each side of said vehicle to provide a longitudinal support, and lateral extension plates supported along their outer edges on said brackets by means of said supporting bolts, each said extension plate having an outer side defining a kinked portion constituting a longitudinal flange resting on said angle iron, and the side walls of said platform presenting butt straps extending longitudinally of said vehicle and supporting the inner sides of said plates substantially in alignment with said platform, and said supporting bolts being resiliently mounted, and an upwardly extending plate member secured to the vertical flange of said angle iron defining a curb.

12. A self propelled amphibious vehicle comprising, in combination, a buoyant body constituting a ferry having retractable land propulsion means and a source of power therefor, a broad platform supported atop said body defining a laterally unobstructed loading surface and a drive-on ramp connected by hinge means to one end of said platform and disposed in its inoperative position with its ramp surface on said platform, said body defining at its bottom portion a plurality of inverted airtight chambers, adapted to be closed at the bottom by water, for the floating condition of said vehicle, and adapted to receive said retractable land propulsion means, said platform having a plurality of recesses longitudinally of its outer edges and presenting round iron bar portions, and said vehicle comprising suspended attachments for widening said platform, comprising girders having an upper surface extending laterally of said platform while in operative condition and having hooked portions hingedly engaging said iron bar portions, a downwardly extending conformation supported against the side of said platform and an upwardly extending conformation defining a curb.

References Cited in the file of this patent
UNITED STATES PATENTS

| | | |
|---|---|---|
| 1,484,109 | Beatty | Feb. 19, 1924 |
| 2,282,745 | Preston | May 12, 1942 |
| 2,466,236 | Hecker | Apr. 5, 1949 |
| 2,514,488 | Hale et al. | July 11, 1950 |
| 2,759,201 | McKinney | Aug. 21, 1956 |

FOREIGN PATENTS

| | | |
|---|---|---|
| 188,663 | Great Britain | Feb. 22, 1923 |

UNITED STATES PATENT OFFICE
CERTIFICATE OF CORRECTION

Patent No. 2,981,221                                        April 25, 1961

Jean Gillois et al.

It is hereby certified that error appears in the above numbered patent requiring correction and that the said Letters Patent should read as corrected below.

Column 6, line 41, for "tractable" read -- retractable --; column 8, lines 2 and 19, strike out "said", each occurrence; lines 4 and 21, before "brackets", each occurrence, insert -- said --.

Signed and sealed this 5th day of December 1961.

(SEAL)
Attest:

ERNEST W. SWIDER                                    DAVID L. LADD
Attesting Officer                                       Commissioner of Patents
                                                                                USCOMM-DC